US011498875B2

(12) United States Patent
Ding et al.

(10) Patent No.: US 11,498,875 B2
(45) Date of Patent: Nov. 15, 2022

(54) METHOD FOR FABRICATING A CERAMIC HEATING BODY WITH POROUS HEATING FILM

(71) Applicant: ALD GROUP LIMITED, Shenzhen (CN)

(72) Inventors: Yi Ding, Shenzhen (CN); Hongsheng Cheng, Shenzhen (CN)

(73) Assignee: ALD GROUP LIMITED, Shenzhen (CN)

(*) Notice: Subject to any disclaimer, the term of this patent is extended or adjusted under 35 U.S.C. 154(b) by 275 days.

(21) Appl. No.: 16/906,518

(22) Filed: Jun. 19, 2020

(65) Prior Publication Data
US 2020/0317585 A1 Oct. 8, 2020

Related U.S. Application Data

(63) Continuation-in-part of application No. PCT/CN2018/074111, filed on Jan. 25, 2018.

(30) Foreign Application Priority Data

Dec. 21, 2017 (CN) .......................... 201711394637.3

(51) Int. Cl.
*C04B 35/626* (2006.01)
*C04B 35/14* (2006.01)
(Continued)

(52) U.S. Cl.
CPC .......... *C04B 35/6264* (2013.01); *C04B 35/14* (2013.01); *C04B 35/6261* (2013.01);
(Continued)

(58) Field of Classification Search
None
See application file for complete search history.

(56) References Cited

U.S. PATENT DOCUMENTS 4,293,357 A * 10/1981 Higuchi ................. B01D 29/52
428/116
8,974,722 B1 * 3/2015 Yamayose ............. C04B 35/478
264/630
(Continued)

FOREIGN PATENT DOCUMENTS

| CN | 102034877 A | 4/2011 |
| CN | 104014195 A | 9/2014 |
| CN | 107010934 A | 8/2017 |

OTHER PUBLICATIONS

Written Opinion dated Sep. 17, 2018, for corresponding International Patent Application No. PCT/CN2018/074111, filed Jan. 25, 2018.
(Continued)

*Primary Examiner* — John J Figueroa
(74) *Attorney, Agent, or Firm* — Steven M. Koehler; Westman, Champlin & Koehler, P.A.

(57) ABSTRACT

The present application discloses a method for fabricating a ceramic heating body with a porous heating film, which relates to technical field of fabricating method of heating body; the method including mixing, ball-milling, defoaming, molding and drying, sintering, paraffin filling, machining, coating, metalizing sintering, and electrode leading; the beneficial effects of the present application is simple in whole fabricating method, and by using a box furnace to sinter the green body under an oxidizing atmosphere and normal pressure, the fabricated ceramic heating body is heated uniformly and the heating efficiency is high.

9 Claims, 1 Drawing Sheet

(51) Int. Cl.
*C04B 35/636* (2006.01)
*C04B 35/64* (2006.01)
*C04B 38/06* (2006.01)
*C04B 41/00* (2006.01)
*C04B 41/45* (2006.01)
*C04B 41/51* (2006.01)
*C04B 41/88* (2006.01)

(52) U.S. Cl.
CPC ............ *C04B 35/636* (2013.01); *C04B 35/64* (2013.01); *C04B 38/0675* (2013.01); *C04B 41/009* (2013.01); *C04B 41/4558* (2013.01); *C04B 41/4578* (2013.01); *C04B 41/51* (2013.01); *C04B 41/88* (2013.01); *C04B 2235/3418* (2013.01); *C04B 2235/5454* (2013.01); *C04B 2235/612* (2013.01)

(56) References Cited

U.S. PATENT DOCUMENTS

| | | | |
|---|---|---|---|
| 2011/0073178 A1 | 3/2011 | Tan et al. | |
| 2015/0050451 A1* | 2/2015 | Yamayose | C04B 35/478 264/630 |
| 2020/0317587 A1* | 10/2020 | Ding | C04B 41/5144 |

OTHER PUBLICATIONS

International Search Report dated Sep. 4, 2018, for corresponding international Patent Application No. PCT/CN2018/074111, filed Jan. 25, 2018.

* cited by examiner

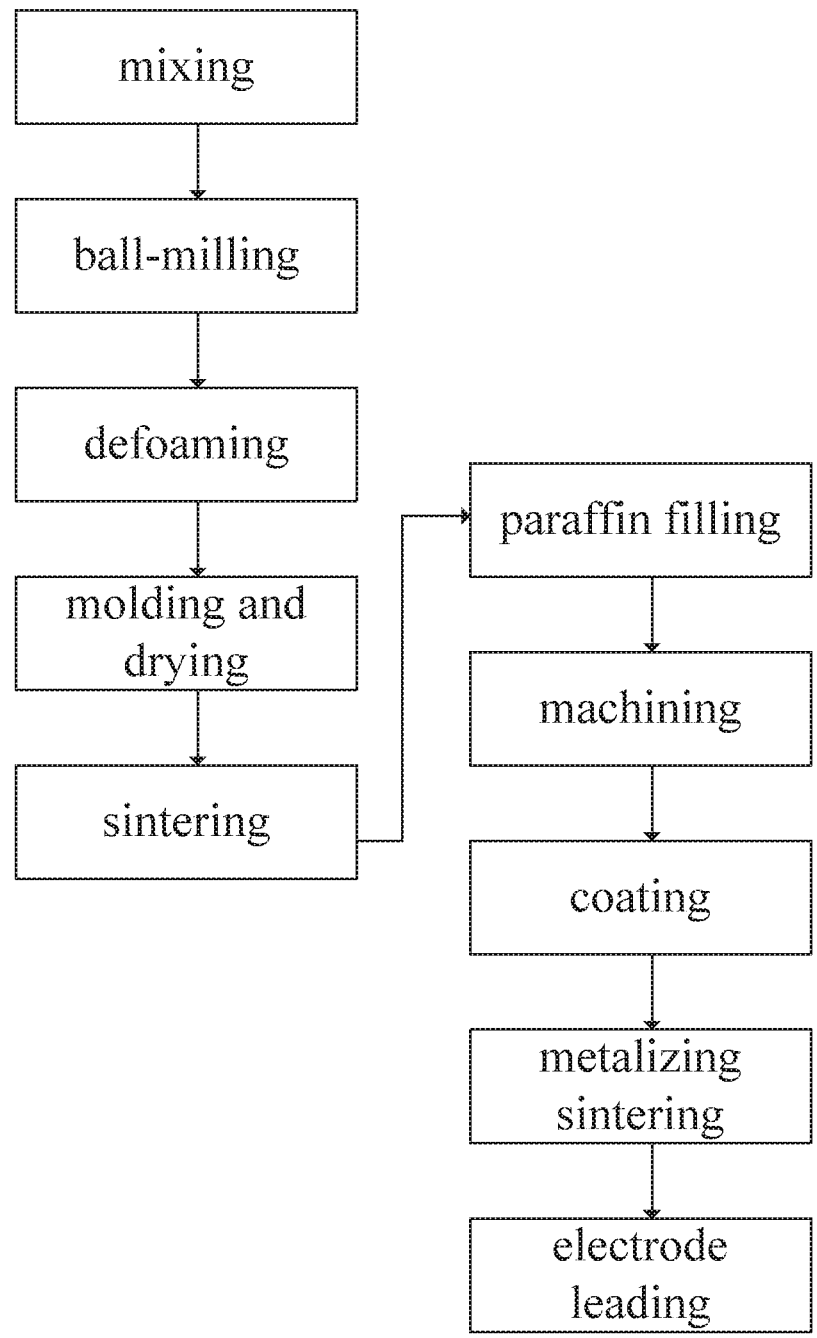

METHOD FOR FABRICATING A CERAMIC HEATING BODY WITH POROUS HEATING FILM

CROSS-REFERENCE TO THE RELATED APPLICATION

The present application is a Continuation-in part application of international application No. PCT/CN2018/074111, filed on Jan. 25, 2018, and claims the priority of CN patent application No. 201711394637.3 filed on Dec. 21, 2017, the entire content of which is incorporated herein by reference.

TECHNICAL FIELD

The present application relates to the technical field of fabricating method of heating body, and more particularly to a method for fabricating a ceramic heating body with a porous heating film.

BACKGROUND

Electronic atomizers and electronic humidifiers are mainly used to evaporate liquids such as atomizing liquid and water into aerosols or gases, and their main structure is a heating body. The heating bodies are mainly divided into three categories:

(1) Traditional heating bodies: stainless steel or alloy resistance wire is wound around glass fiber, or resistance wire is wrapped with glass fiber and oil-absorbing cotton. Since the glass fiber is easy to produce debris, and liquid absorption amount is small and oil absorption consistency is poor, and although the oil absorption cotton is good in oil absorption, it is very easy to be burnt, which greatly limits its application in electronic atomizers and humidification equipment.

(2) Porous ceramic heating body with resistance wire: the porous ceramic is wound with stainless steel or alloy resistance wire, or the resistance wire is sintered in the inner layer of the ceramic. The porous ceramic has a large porosity and a large liquid absorption amount, which can continuously introduce the atomizing liquid/water from the storage liquid cavity to heat and atomize. In the fabricating method, due to the different expansion coefficients of the heating wire and the porous ceramic, it is easy to cause problems such as cracking of the porous ceramic, separation of the heating wire and the porous ceramic, and so on.

(3) Porous ceramic heating body with printed heating film: printing a resistance heating film on the surface of the porous ceramic, since the porous ceramic has a large porosity, the resistive slurry is embedded in the ceramic pores when printing the resistance heating film, which greatly reduces the porosity and liquid absorption amount, and the heating rate is affected.

SUMMARY

In order to overcome the shortcomings of the prior art, the present application provides a method for fabricating a ceramic heating body with a porous heating film. The heating body fabricated by the fabricating method is heated uniformly and has high heating efficiency.

The technical scheme adopted by the present application is to provide a method for fabricating a ceramic heating body with a porous heating film, with improvements in that the method includes steps as follow:

A), mixing: taking diatomaceous earth accounting for 15-55%, starch accounting for 5-25%, nano-silica solution accounting for 0-2%, and deionized water accounting for 40-70% according to weight percentage; and then evenly mixing and stirring to obtain ceramic substrate slurry;

taking resistive slurry accounting for 15-40%, starch accounting for 30-60%, and organic solvent accounting for 10-30% according to weight percentage, and then evenly mixing and stirring to obtain resistive slurry with pore-forming agent;

B), ball-milling: adding grinding balls to the ceramic substrate slurry obtained in the step A), and putting them into a ball-milling tank to conduct wet ball milling for a period of 4-24 hours;

adding grinding balls to the resistive slurry obtained in the step A), and putting them into a ball-milling tank to conduct wet ball milling for a period of 24-48 h;

C), defoaming: defoaming the ceramic substrate slurry after wet ball milling in the step B) under a vacuum condition;

defoaming the resistive slurry after wet ball milling in the step B) under a vacuum condition;

D), molding and drying: casting the ceramic substrate slurry obtained in the step C) by a casting machine to obtain a ceramic substrate with a desired shape, and drying the ceramic substrate to form a green body;

E), sintering: placing the green body obtained in the step D) into a graphite crucible and burying that of in isolating powders, and then sintering the green body buried in the isolating powders using a box furnace under normal pressure, and the sintering atmosphere is oxygen, wherein the green body is sintered to obtain a semi-finished product of porous ceramic heating body substrate;

F), paraffin filling: liquefying paraffin using a heating cylinder, and completely immersing the semi-finished product of porous ceramic heating body substrate obtained in the step E) into liquefied paraffin for a period of 1-5 hours, then cooling at room temperature for a period of 4-24 hours to obtain a porous ceramic heating body substrate containing paraffin;

G), machining: machining the porous ceramic heating body substrate containing paraffin obtained in the step F) to remove a paraffin layer on an outer surface of the porous ceramic heating body substrate;

H), coating: coating the resistive slurry obtained in the step C) onto an outer surface of the porous ceramic heating body substrate obtained in the step G) according to desired thickness, to form a layer of a heating film onto the outer surface of the porous ceramic heating body substrate;

I), metalizing sintering: placing the porous ceramic heating body substrate with the heating film obtained in the step H) into a graphite crucible, and then placing into a sintering furnace for paraffin discharging, and metalizing sintering of the porous resistance heating film to obtain a heating body green body; and J), electrode leading: performing a nickel plating process onto two ends of the heating body green body obtained in the step I), and then performing brazing at a position after the nickel plating process to lead out electrode to obtain a finished product of porous ceramic heating body.

Further, in the step A), the ceramic substrate slurry is composed of following raw materials with following weight percentages:

the diatomaceous earth accounting for 21%,
the starch accounting for 16%,
the nano-silica solution accounting for 1%, and
the deionized water accounting for 62%.

Further, in the step A), the resistive slurry is composed of following raw materials with following weight percentages:
the resistive slurry accounting for 30%,
the starch accounting for 45%, and
the organic solvent accounting for 25%.

Further, in the step A), the ceramic substrate slurry is composed of following raw materials with following weight percentages:
the diatomaceous earth accounting for 15%,
the starch accounting for 15%, and
the deionized water accounting for 70%.

Further, in the step A), the resistive slurry is composed of following raw materials with following weight percentages:
the resistive slurry accounting for 40%,
the starch accounting for 30%, and
the organic solvent accounting for 30%.

Further, in the step A), the ceramic substrate slurry is composed of following raw materials with following weight percentages:
the diatomaceous earth accounting for 50%,
the starch accounting for 8%,
the nano-silica solution accounting for 2%, and
the deionized water accounting for 40%.

Further, in the step A), the resistive slurry is composed of following raw materials with following weight percentages:
the resistive slurry accounting for 30%,
the starch accounting for 50%, and
the organic solvent accounting for 20%.

Further, in the step E), a sintering temperature for sintering the green body is 900-1400° C., a heating rate is 1-20° C./min, and a holding time is a period of 2-12 hours.

Further, in the step I), a heating rate for metallizing and sintering is 1-5° C./min, a temperature for metallizing and sintering is 800-1000° C., and a holding time is a period of 1-2 hours.

The beneficial effects of the present application are: the present application provides a method for fabricating a ceramic heating body with a porous heating film, which in sequence performs mixing, ball-milling, defoaming, molding and drying, sintering, paraffin filling, machining, coating, metalizing sintering, and electrode leading; the whole fabricating method is simple. After the sintering of the green body of the ceramic heating body is completed, due to the step of paraffin filling is firstly performed to block pores of the ceramic heating body substrate, and then step of coating the resistive slurry is performed, and then the step of metalizing sintering is performed, such that the metalizing sintering of the resistance heating film is completed, as well as the step of the paraffin discharging of the pores of the ceramic heating body substrate is realized. The method avoids the situation that the resistive slurry blocks the ceramic pores, the liquid absorption amount of the heating body does not decrease, and the fabricated heating body is heated uniformly and the heating efficiency is high.

BRIEF DESCRIPTION OF THE DRAWINGS

FIG. 1 is a flow chart of a method for fabricating a ceramic heating body with a porous heating film according to the present application.

DETAILED DESCRIPTION

The present application will be further described below with reference to the drawings and embodiments.

The concept, specific structure, and technical effects of the present application will be described clearly and completely in conjunction with the embodiments and drawings to fully understand the purpose, features, and effects of the present application. Obviously, the described embodiments are only a part of the embodiments of the present application, but not all the embodiments. Based on the embodiments of the present application, other embodiments obtained by those skilled in the art without paying creative efforts belong to the scope of protection of the present application. In addition, all the coupling/connecting relationships involved in the present application are not only directly connected by members, but refer to that a more optimal connection structure can be formed by adding or reducing connection accessories according to the specific implementation. The various technical features in the creation of the present application can be combined interactively on the premise that they do not contradict each other.

Embodiment 1

Referring to FIG. 1, the present embodiment provides a method for fabricating a ceramic heating body with a porous heating film. In particular, the method includes the following steps:

A), mixing: taking diatomaceous earth accounting for 21%, starch accounting for 16%, nano-silica solution accounting for 1%, and deionized water accounting for 62% according to weight percentage; and then evenly mixing and stirring to obtain ceramic substrate slurry;

taking resistive slurry accounting for 30%, starch accounting for 45%, and organic solvent accounting for 25% according to weight percentage, and then evenly mixing and stirring to obtain resistive slurry with pore-forming agent;

B), ball-milling: adding grinding balls to the ceramic substrate slurry obtained in the step A), and putting them into a ball-milling tank to conduct wet ball milling for 24 hours; adding grinding balls to the resistive slurry obtained in the step A), and putting them into a ball-milling tank to conduct wet ball milling for 48 h;

C), defoaming: defoaming the ceramic substrate slurry after wet ball milling in the step B) under a vacuum condition; defoaming the resistive slurry after wet ball milling in the step B) under a vacuum condition;

D), molding and drying: casting the ceramic substrate slurry obtained in the step C) by a casting machine to obtain a ceramic substrate with a desired shape, and drying the ceramic substrate to form a green body;

E), sintering: placing the green body obtained in the step D) into a graphite crucible and burying that of in isolating powders, and then sintering the green body buried in the isolating powders using a box furnace under normal pressure, and the sintering atmosphere is oxygen, the sintering temperature for sintering the green body is 1200° C., the heating rate is 5° C./min, and the holding time is 2 hours, and the green body is sintered to obtain a semi-finished product of porous ceramic heating body substrate;

F), paraffin filling: liquefying paraffin using a heating cylinder, and completely immersing the semi-finished product of porous ceramic heating body substrate obtained in the step E) into liquefied paraffin for 5 hours, then cooling at room temperature for 24 hours to obtain a porous ceramic heating body substrate containing paraffin; during the step of paraffin filling, the liquefied paraffin completely fills the surface pores of the porous ceramic heating body substrate.

G), machining: machining the porous ceramic heating body substrate containing paraffin obtained in the step F) to remove a paraffin layer on an outer surface of the porous ceramic heating body substrate;

H), coating: coating the resistive slurry obtained in the step C) onto an outer surface of the porous ceramic heating body substrate obtained in the step G) according to desired thickness, to form a layer of a heating film onto the outer surface of the porous ceramic heating body substrate;

I), metalizing sintering: placing the porous ceramic heating body substrate with the heating film obtained in the step H) into a graphite crucible, and then placing into a sintering furnace for paraffin discharging, and metalizing sintering of the porous resistance heating film to obtain a heating body green body; among then, the heating rate is 2° C./min, the temperature for metallizing and sintering is 850° C., and the holding time is 1 hour;

J), electrode leading: performing a nickel plating process onto two ends of the heating body green body obtained in the step I), and then performing brazing at a position after the nickel plating process to lead out electrode to obtain a finished product of porous ceramic heating body.

Comparative Embodiment 1

The present embodiment provides a method for fabricating a ceramic heating body with a porous heating film. In particular, the method includes the following steps:

A), mixing: taking diatomaceous earth accounting for 21%, starch accounting for 16%, nano-silica solution accounting for 1%, and deionized water accounting for 62% according to weight percentage; and then evenly mixing and stirring to obtain ceramic substrate slurry;

taking resistive slurry accounting for 30%, starch accounting for 45%, and organic solvent accounting for 25% according to weight percentage, and then evenly mixing and stirring to obtain resistive slurry with pore-forming agent;

B), ball-milling: adding grinding balls to the ceramic substrate slurry obtained in the step A), and putting them into a ball-milling tank to conduct wet ball milling for a period of 24 hours; adding grinding balls to the resistive slurry obtained in the step A), and putting them into a ball-milling tank to conduct wet ball milling for a period of 48 h;

C), defoaming: defoaming the ceramic substrate slurry after wet ball milling in the step B) under a vacuum condition; defoaming the resistive slurry after wet ball milling in the step B) under a vacuum condition;

D), molding and drying: casting the ceramic substrate slurry obtained in the step C) by a casting machine to obtain a ceramic substrate with a desired shape, and drying the ceramic substrate to form a green body;

E), sintering: placing the green body obtained in the step D) into a graphite crucible and burying that of in isolating powders, and then sintering the green body buried in the isolating powders using a box furnace under normal pressure, and the sintering atmosphere is oxygen, the sintering temperature for sintering the green body is 1200° C., the heating rate is 5° C./min, and the holding time is 2 hours, and the green body is sintered to obtain a semi-finished product of porous ceramic heating body substrate;

F), coating: coating the resistive slurry obtained in the step C) onto an outer surface of the porous ceramic heating body substrate obtained in the step E) according to desired thickness, to form a layer of a heating film onto the outer surface of the porous ceramic heating body substrate;

G), metalizing sintering: placing the porous ceramic heating body substrate with the heating film into a graphite crucible, and then placing into a sintering furnace for paraffin discharging, and metalizing sintering of the porous resistance heating film to obtain a heating body green body; among then, the heating rate is 2° C./min, the temperature for metallizing and sintering is 850° C., and the holding time is 1 hour;

I), electrode leading: performing a nickel plating process onto two ends of the heating body green body obtained in the step G), and then performing brazing at a position after the nickel plating process to lead out electrode to obtain a finished product of porous ceramic heating body.

Embodiment 2

Referring to FIG. 1, the present embodiment provides a method for fabricating a ceramic heating body with a porous heating film, in particular, the method includes the following steps of:

A), mixing: taking diatomaceous earth accounting for 15%, starch accounting for 15%, and deionized water accounting for 70% according to weight percentage; and then evenly mixing and stirring to obtain ceramic substrate slurry;

taking resistive slurry accounting for 40%, starch accounting for 30%, and organic solvent accounting for 30% according to weight percentage, and then evenly mixing and stirring to obtain resistive slurry with pore-forming agent;

B), ball-milling: adding grinding balls to the ceramic substrate slurry obtained in the step A), and putting them into a ball-milling tank to conduct wet ball milling for 14 hours; adding grinding balls to the resistive slurry obtained in the step A), and putting them into a ball-milling tank to conduct wet ball milling for 36 h;

C), defoaming: defoaming the ceramic substrate slurry after wet ball milling in the step B) under a vacuum condition; defoaming the resistive slurry after wet ball milling in the step B) under a vacuum condition;

D), molding and drying: casting the ceramic substrate slurry obtained in the step C) by a casting machine to obtain a ceramic substrate with a desired shape, and drying the ceramic substrate to form a green body;

E), sintering: placing the green body obtained in the step D) into a graphite crucible and burying that of in isolating powders, and then sintering the green body buried in the isolating powders using a box furnace under normal pressure, and the sintering atmosphere is oxygen, and the green body is sintered to obtain a semi-finished product of porous ceramic heating body substrate; among then, the sintering temperature for sintering the green body is 900° C., the heating rate is 1° C./min, and the holding time is 2 hours, F), paraffin filling: liquefying paraffin using a heating cylinder, and completely immersing the semi-finished product of porous ceramic heating body substrate obtained in the step E) into liquefied paraffin for 1 hour, then cooling at room temperature for 4 hours to obtain a porous ceramic heating body substrate containing paraffin;

G), machining: machining the porous ceramic heating body substrate containing paraffin obtained in the step F) to remove a paraffin layer on an outer surface of the porous ceramic heating body substrate;

H), coating: coating the resistive slurry obtained in the step C) onto an outer surface of the porous ceramic heating body substrate obtained in the step G) according to desired thickness, to form a layer of a heating film onto the outer surface of the porous ceramic heating body substrate;

I), metalizing sintering: placing the porous ceramic heating body substrate with the heating film obtained in the step H) into a graphite crucible, and then placing into a sintering furnace for paraffin discharging, and metalizing sintering of the porous resistance heating film to obtain a heating body green body; among then, the heating rate of metalizing sintering is 1° C./min, the temperature for metallizing and sintering is 800° C., and the holding time is 1 hour;

J), electrode leading: performing a nickel plating process onto two ends of the heating body green body obtained in the step I), and then performing brazing at a position after the nickel plating process to lead out electrode to obtain a finished product of porous ceramic heating body.

Embodiment 3

Referring to FIG. 1, the present embodiment provides a method for fabricating a ceramic heating body with a porous heating film, in particular, the method includes the following steps:

A), mixing: taking diatomaceous earth accounting for 50%, starch accounting for 8%, nano-silica solution accounting for 2%, and deionized water accounting for 40% according to weight percentage; and then evenly mixing and stirring to obtain ceramic substrate slurry;

taking resistive slurry accounting for 30%, starch accounting for 50%, and organic solvent accounting for 20% according to weight percentage, and then evenly mixing and stirring to obtain resistive slurry with pore-forming agent;

B), ball-milling: adding grinding balls to the ceramic substrate slurry obtained in the step A), and putting them into a ball-milling tank to conduct wet ball milling for 4 hours; adding grinding balls to the resistive slurry obtained in the step A), and putting them into a ball-milling tank to conduct wet ball milling for 24 h;

C), defoaming: defoaming the ceramic substrate slurry after wet ball milling in the step B) under a vacuum condition; defoaming the resistive slurry after wet ball milling in the step B) under a vacuum condition;

D), molding and drying: casting the ceramic substrate slurry obtained in the step C) by a casting machine to obtain a ceramic substrate with a desired shape, and drying the ceramic substrate to form a green body;

E), sintering: placing the green body obtained in the step D) into a graphite crucible and burying that of in isolating powders, and then sintering the green body buried in the isolating powders using a box furnace under normal pressure, and the sintering atmosphere is oxygen, and the green body is sintered to obtain a semi-finished product of porous ceramic heating body substrate; among then, the sintering temperature for sintering the green body is 1400° C., the heating rate is 20° C./min, and the holding time is 12 hours, F), paraffin filling: liquefying paraffin using a heating cylinder, and completely immersing the semi-finished product of porous ceramic heating body substrate obtained in the step E) into liquefied paraffin for 3 hours, then cooling at room temperature for 14 hours to obtain a porous ceramic heating body substrate containing paraffin;

G), machining: machining the porous ceramic heating body substrate containing paraffin obtained in the step F) to remove a paraffin layer on an outer surface of the porous ceramic heating body substrate;

H), coating: coating the resistive slurry obtained in the step C) onto an outer surface of the porous ceramic heating body substrate obtained in the step G) according to desired thickness, to form a layer of a heating film onto the outer surface of the porous ceramic heating body substrate;

I), metalizing sintering: placing the porous ceramic heating body substrate with the heating film obtained in the step H) into a graphite crucible, and then placing into a sintering furnace for paraffin discharging, and metalizing sintering of the porous resistance heating film to obtain a heating body green body; among then, the heating rate of metalizing sintering is 5° C./min, the temperature for metallizing and sintering is 1000° C., and the holding time is 2 hours;

J), electrode leading: performing a nickel plating process onto two ends of the heating body green body obtained in the step I), and then performing brazing at a position after the nickel plating process to lead out electrode to obtain a finished product of porous ceramic heating body.

Taking heating body samples of embodiment 1, comparative embodiment 1, embodiment 2 and embodiment 3 and testing the following indicators 1), resistance: testing the resistance value with a resistance meter.

2), porosity: respectively testing the dry weight, wet weight and floating weight of porous ceramics by the Archimedes principle, and then calculating the porosity.

3), heating rate: using an infrared camera to measure the temperature of the heating body samples in real time when heating power is 8 W, then calculating according to the following formula to obtain the heating rate:

$$V_{(hr)} = (265 - T_r)/t;$$

$V_{(hr)}$ represents heating rate; $T_r$ represents room temperature; and t represents used time.

| embodiments | Indexes | | |
|---|---|---|---|
| | porosity/ % | heating rate ° C./s | resistance/ Ω |
| embodiments 1 | 55 | 150 | 1.1 |
| Comparative embodiment 1 | 50 | 110 | 1.3 |
| embodiments 2 | 60 | 150 | 1.1 |
| embodiments 3 | 45 | 150 | 1.1 |

As shown in Table 1, the comparative embodiment 1 does not fill paraffin onto the surface of the porous ceramics and directly coating the resistive slurry film thereon. Compared to embodiment 1, the porosity is decreased, the heating rate is decreased, the resistance is increased, and the heating is uneven.

In summary, the present application provides a method for fabricating a ceramic heating body with a porous heating film, which in sequence performs mixing, ball-milling, defoaming, molding and drying, sintering, paraffin filling, machining, coating, metalizing sintering, and electrode leading; the whole fabricating method is simple. By using a box furnace to sinter the green body under an oxidizing atmosphere and normal pressure, the fabricated ceramic heating body is heated uniformly and the heating efficiency is high. After the sintering of the green body of the ceramic heating body is completed, due to the step of paraffin filling is firstly performed to block pores of the ceramic heating body substrate, and then step of coating the resistive slurry is performed, and then the step of metalizing sintering is performed, which avoids the situation that the resistive slurry blocks the ceramic pores. Then the step of metalizing sintering is performed, and in the step of metalizing sintering, the resistance heating film is sintered at high temperature and attached to the outer surface of the porous ceramic heating body substrate, such that the metalizing sintering of the resistance heating film is completed, as well as the paraffin discharging of the pores of the ceramic heating body substrate is realized, thereby the porosity does not decrease. The method avoids the situation that the resistive slurry blocks the ceramic pores, the liquid absorption amount of the heating body does not decrease, and the fabricated heating body is heated uniformly and the heating efficiency is high.

The aforementioned embodiments are only preferred embodiments of the present application. For one of ordinary skill in the art, according to the thought of the present application, specific implementation modes and application scopes may be modified, and the content of the specification should not be interpreted as any limitation to the present application.

What is claimed is:

1. A method for fabricating a ceramic heating body with a porous heating film, comprising steps of:
    A), mixing: taking diatomaceous earth accounting for 15-55%, starch accounting for 5-25%, nano-silica solution accounting for 0-2%, and deionized water accounting for 40-70% according to weight percentage; and then evenly mixing and stirring to obtain ceramic substrate slurry;
    taking resistive slurry accounting for 15-40%, starch accounting for 30-60%, and organic solvent accounting for 10-30% according to weight percentage, and then evenly mixing and stirring to obtain resistive slurry with pore-forming agent;
    B), ball-milling: adding grinding balls to the ceramic substrate slurry obtained in the step A), and putting them into a ball-milling tank to conduct wet ball milling for a period of 4-24 hours;
    adding grinding balls to the resistive slurry obtained in the step A), and putting them into a ball-milling tank to conduct wet ball milling for a period of 24-48 h;
    C), defoaming: defoaming the ceramic substrate slurry after wet ball milling in the step B) under a vacuum condition;
    defoaming the resistive slurry after wet ball milling in the step B) under a vacuum condition;
    D), molding and drying: casting the ceramic substrate slurry obtained in the step C) by a casting machine to obtain a ceramic substrate with a desired shape, and drying the ceramic substrate to form a green body;
    E), sintering: placing the green body obtained in the step D) into a graphite crucible and burying that of in isolating powders, and then sintering the green body buried in the isolating powders using a box furnace under normal pressure, and the sintering atmosphere is oxygen, wherein the green body is sintered to obtain a semi-finished product of porous ceramic heating body substrate;
    F), paraffin filling: liquefying paraffin using a heating cylinder, and completely immersing the semi-finished product of porous ceramic heating body substrate obtained in the step E) into liquefied paraffin for 1-5 hours, then cooling at room temperature for 4-24 hours to obtain a porous ceramic heating body substrate containing paraffin;
    G), machining: machining the porous ceramic heating body substrate containing paraffin obtained in the step F) to remove a paraffin layer on an outer surface of the porous ceramic heating body substrate;
    H), coating: coating the resistive slurry obtained in the step C) onto an outer surface of the porous ceramic heating body substrate obtained in the step G) according to desired thickness, to form a layer of a heating film onto the outer surface of the porous ceramic heating body substrate;
    I), metalizing sintering: placing the porous ceramic heating body substrate with the heating film into a graphite crucible, and then placing into a sintering furnace for paraffin discharging, and metalizing sintering of the porous resistance heating film to obtain a heating body green body; and
    J), electrode leading: performing a nickel plating process onto two ends of the heating body green body obtained in the step I), and then performing brazing at a position after the nickel plating process to lead out electrode to obtain a finished product of porous ceramic heating body.

2. The method for fabricating a ceramic heating body with a porous heating film of claim 1, wherein in the step A), the ceramic substrate slurry is composed of following raw materials with following weight percentages:
    the diatomaceous earth accounting for 21%,
    the starch accounting for 16%,
    the nano-silica solution accounting for 1%, and
    the deionized water accounting for 62%.

3. The method for fabricating a ceramic heating body with a porous heating film of claim 1, wherein in the step A), the resistive slurry is composed of following raw materials with following weight percentages:
    the resistive slurry accounting for 30%,
    the starch accounting for 45%, and
    the organic solvent accounting for 25%.

4. The method for fabricating a ceramic heating body with a porous heating film of claim 1, wherein in the step A), the ceramic substrate slurry is composed of following raw materials with following weight percentages:
    the diatomaceous earth accounting for 15%,
    the starch accounting for 15%, and
    the deionized water accounting for 70%.

5. The method for fabricating a ceramic heating body with a porous heating film of claim 4, wherein in the step A), the resistive slurry is composed of following raw materials with following weight percentages:
    the resistive slurry accounting for 40%,
    the starch accounting for 30%, and
    the organic solvent accounting for 30%.

6. The method for fabricating a ceramic heating body with a porous heating film of claim 1, wherein in the step A), the ceramic substrate slurry is composed of following raw materials with following weight percentages:
    the diatomaceous earth accounting for 50%,
    the starch accounting for 8%,
    the nano-silica solution accounting for 2%, and
    the deionized water accounting for 40%.

7. The method for fabricating a ceramic heating body with a porous heating film of claim 6, wherein in the step A), the resistive slurry is composed of following raw materials with following weight percentages:
    the resistive slurry accounting for 30%,
    the starch accounting for 50%, and
    the organic solvent accounting for 20%.

8. The method for fabricating a ceramic heating body with a porous heating film of claim 1, wherein in the step E), a sintering temperature for sintering the green body is 900-1400° C., a heating rate is 1-20° C./min, and a holding time is a period of 2-12 hours.

9. The method for fabricating a ceramic heating body with a porous heating film of claim 1, wherein in the step I), a heating rate for metallizing and sintering is 1-5° C./min, a temperature for metallizing and sintering is 800-1000° C., and a holding time is a period of 1-2 hours.

* * * * *